US010726613B2

(12) United States Patent
Fan et al.

(10) Patent No.: US 10,726,613 B2
(45) Date of Patent: Jul. 28, 2020

(54) CREATING A THREE-DIMENSIONAL MAP UTILIZING RETRIEVED RFID TAG INFORMATION

(71) Applicant: International Business Machines Corporation, Armonk, NY (US)

(72) Inventors: Si Bin Fan, Beijing (CN); Yu Gu, Cedar Park, TX (US); Su Liu, Austin, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/809,736

(22) Filed: Nov. 10, 2017

(65) Prior Publication Data

US 2019/0147646 A1    May 16, 2019

(51) Int. Cl.
*G06T 17/05* (2011.01)
*H04W 4/02* (2018.01)
*G06K 7/10* (2006.01)
*H04W 4/80* (2018.01)
*H04W 4/90* (2018.01)

(52) U.S. Cl.
CPC .......... *G06T 17/05* (2013.01); *G06K 7/10366* (2013.01); *H04W 4/02* (2013.01); *H04W 4/80* (2018.02); *H04W 4/90* (2018.02)

(58) Field of Classification Search
CPC ........ G06T 17/05; H04W 4/80; H04W 4/008; H04W 4/02; G06K 7/10366
See application file for complete search history.

(56) References Cited

U.S. PATENT DOCUMENTS

| 5,172,110 | A | 12/1992 | Tiefengraber |
| 6,184,651 | B1 | 2/2001 | Fernandez et al. |
| 7,538,715 | B2 | 5/2009 | Langford et al. |
| 7,768,392 | B1 | 8/2010 | Brand et al. |
| 7,928,831 | B1 * | 4/2011 | Johnson ................... G07C 9/23 340/10.1 |
| 8,390,444 | B2 | 3/2013 | Li et al. |
| 8,466,777 | B2 * | 6/2013 | Matsumoto .......... G06Q 10/087 340/10.5 |

(Continued)

OTHER PUBLICATIONS

Ruhanen et al., "Sensor-Enabled RFID Tag Handbook," Bridge, Building Radio Frequency Identification for the Global Environment, Jan. 2008, pp. 1-47.

(Continued)

*Primary Examiner* — Joseph H Feild
*Assistant Examiner* — Rufus C Point
(74) *Attorney, Agent, or Firm* — Zilka-Kotab, P.C.

(57) ABSTRACT

A computer-implemented method according to one embodiment includes identifying a mobile detection device, requesting the mobile detection device to travel to a predetermined location, requesting the mobile detection device to retrieve location information and supplementary information from a radio frequency identification (RFID) tag at the predetermined location, receiving the location information and the supplementary information from the mobile detection device, determining a three-dimensional location of the RFID tag, based on the location information, and creating a three-dimensional map that includes the three-dimensional location of the RFID tag and the supplementary information from the RFID tag.

20 Claims, 7 Drawing Sheets

(56) References Cited

U.S. PATENT DOCUMENTS

| | | | |
|---|---|---|---|
| 8,629,764 B2* | 1/2014 | Moshfeghi | G01D 21/00 340/10.4 |
| 8,994,502 B2* | 3/2015 | Kawaguchi | G06Q 50/28 340/10.1 |
| 9,492,922 B1* | 11/2016 | Johnson | G05D 1/0297 |
| 9,614,614 B2 | 4/2017 | Bergeron | |
| 9,665,094 B1 | 5/2017 | Russell | |
| 2001/0034223 A1 | 10/2001 | Rieser et al. | |
| 2005/0159863 A1* | 7/2005 | Howard | G08G 1/20 701/37 |
| 2005/0197775 A1* | 9/2005 | Smith | G08B 21/10 702/3 |
| 2005/0259930 A1* | 11/2005 | Elkins, II | G01V 15/00 385/100 |
| 2006/0109131 A1* | 5/2006 | Sen | G01V 15/00 340/572.8 |
| 2006/0208888 A1* | 9/2006 | Patel | G08B 3/1083 340/572.1 |
| 2008/0238610 A1* | 10/2008 | Rosenberg | G06Q 20/20 340/5.7 |
| 2008/0278289 A1 | 11/2008 | Gantner | |
| 2008/0318597 A1* | 12/2008 | Berns | H04L 67/22 455/456.5 |
| 2010/0127828 A1 | 5/2010 | Connolly et al. | |
| 2010/0141378 A1* | 6/2010 | Lee | G06K 7/0008 340/3.1 |
| 2010/0201488 A1* | 8/2010 | Stern | G01S 1/68 340/10.1 |
| 2010/0201520 A1* | 8/2010 | Stern | G01S 13/75 340/572.1 |
| 2010/0207765 A1* | 8/2010 | Brander | G06K 7/0008 340/572.1 |
| 2010/0297787 A1* | 11/2010 | Niles | H01J 37/3056 438/16 |
| 2011/0043373 A1* | 2/2011 | Best | G01S 1/68 340/8.1 |
| 2012/0242457 A1* | 9/2012 | Murakami | G06Q 10/087 340/10.1 |
| 2013/0030931 A1* | 1/2013 | Moshfeghi | G01S 19/48 705/16 |
| 2013/0113606 A1* | 5/2013 | Etheridge | G06K 19/07345 340/10.1 |
| 2013/0120118 A1* | 5/2013 | Moshfeghi | G01D 21/00 340/10.4 |
| 2013/0207803 A1 | 8/2013 | Charych | |
| 2013/0317642 A1* | 11/2013 | Asaria | G06Q 50/28 700/216 |
| 2014/0061377 A1* | 3/2014 | Smith | B64C 3/10 244/63 |
| 2014/0148196 A1* | 5/2014 | Bassan-Eskenazi | G06K 7/10297 455/456.1 |
| 2014/0203909 A1* | 7/2014 | Elgebaly | H04W 4/21 340/8.1 |
| 2014/0277854 A1* | 9/2014 | Jones | H04B 7/18504 701/3 |
| 2014/0285317 A1 | 9/2014 | Shimizu et al. | |
| 2014/0361078 A1* | 12/2014 | Davidson | G06K 7/10356 235/385 |
| 2015/0048789 A1 | 2/2015 | Kim et al. | |
| 2015/0148129 A1* | 5/2015 | Austerlade | H04L 43/04 463/31 |
| 2015/0149837 A1* | 5/2015 | Alonso | G06K 7/10227 714/57 |
| 2016/0316325 A1* | 10/2016 | Sadr | H04W 4/027 |
| 2017/0075962 A1* | 3/2017 | Hitchcock | G06Q 10/08 |
| 2017/0092090 A1* | 3/2017 | Lerner | G06K 7/10366 |
| 2017/0193257 A1 | 7/2017 | Fan et al. | |
| 2017/0193779 A1* | 7/2017 | Langer | G08B 13/2462 |
| 2017/0199520 A1* | 7/2017 | Glatfelter | G05D 1/0011 |
| 2017/0225336 A1* | 8/2017 | Deyle | G06K 19/14 |
| 2017/0293301 A1* | 10/2017 | Myslinski | B64D 5/00 |
| 2017/0318422 A1* | 11/2017 | Kokkonen | H04W 4/023 |
| 2017/0358201 A1* | 12/2017 | Govers | G05D 1/0248 |
| 2018/0157259 A1* | 6/2018 | Myslinski | G05D 1/0094 |
| 2018/0190051 A1* | 7/2018 | Outwater | G06Q 10/02 |

OTHER PUBLICATIONS

Hubbard et al., "Feasibility Study of UAV use for RFID Material Tracking on Construction Sites," 51st ASC Annual International Conference Proceedings, 2015, pp. 1-8.

Motlagh et al., "Low-Altitude Unmanned Aerial Vehicles-Based Internet of Things Services: Comprehensive Survey and Future Perspectives." IEEE Internet of Things Journal 3.6 (2016): pp. 899-922.

Allegretti et al., "Recharging RFID Tags for Environmental Monitoring Using UAVs: A Feasibility Analysis." Wireless Sensor Network 7.2 (2015): pp. 13-19.

NIST, "NIST Cloud Computing Program," Information Technology Laboratory, retrieved from http://www.nist.gov/itl/cloud/, Nov. 2013, pp. 1-2.

Mell et al., "The NIST Definition of Cloud Computing," Version 15, Oct. 2009, pp. 1-2.

Mell et al., "The NIST Definition of Cloud Computing," National Institute of Standards and Technology, Special Publication 800-145, Sep. 2011, pp. 1-7.

Shu et al., "TOC: Localizing Wireless Rechargeable Sensors with Time of Charge," IEEE Conference on Computer Communications, 2014, pp. 388-396.

Zhao et al., "A Battery-Free RFID-Based Indoor Acoustic Localization Platform." 2013, pp. 1-8, Retrieved From https://sensor.cs.washington.edu/pubs/2013-RFID-BatteryFreeAcousticLocalization.pdf.

* cited by examiner

CREATING A THREE-DIMENSIONAL MAP UTILIZING RETRIEVED RFID TAG INFORMATION

BACKGROUND

The present invention relates to radio frequency identification (RFID) retrieval and analysis, and more specifically, this invention relates to creating a three-dimensional map utilizing data that is retrieved from an RFID tag.

During and after events such as natural disasters and accidents, a timely and accurate response can help save lives and retrieve property. However, many times it is risky and difficult to reach accident and disaster sites, and precious time is spent manually performing inefficient search techniques at such sites utilizing expensive equipment.

SUMMARY

A computer-implemented method according to one embodiment includes identifying a mobile detection device, requesting the mobile detection device to travel to a predetermined location, requesting the mobile detection device to retrieve location information and supplementary information from a radio frequency identification (RFID) tag at the predetermined location, receiving the location information and the supplementary information from the mobile detection device, determining a three-dimensional location of the RFID tag, based on the location information, and creating a three-dimensional map that includes the three-dimensional location of the RFID tag and the supplementary information from the RFID tag.

According to another embodiment, a computer program product for creating a three-dimensional map utilizing retrieved RFID tag information includes a computer readable storage medium having program instructions embodied therewith, where the computer readable storage medium is not a transitory signal per se, and where the program instructions are executable by a processor to cause the processor to perform a method comprising identifying a mobile detection device, utilizing the processor, requesting the mobile detection device to travel to a predetermined location, utilizing the processor, requesting the mobile detection device to retrieve location information and supplementary information from the RFID tag at the predetermined location, utilizing the processor, receiving the location information and the supplementary information from the mobile detection device, utilizing the processor, determining, utilizing the processor, a three-dimensional location of the RFID tag, based on the location information, and creating the three-dimensional map that includes the three-dimensional location of the RFID tag and the supplementary information from the RFID tag, utilizing the processor.

A system according to another embodiment includes a processor and logic integrated with the processor, executable by the processor, or integrated with and executable by the processor, where the logic is configured to identify a mobile detection device, request the mobile detection device to travel to a predetermined location, request the mobile detection device to retrieve location information and supplementary information from a radio frequency identification (RFID) tag at the predetermined location, receive the location information and the supplementary information from the mobile detection device, determine a three-dimensional location of the RFID tag, based on the location information, and create a three-dimensional map that includes the three-dimensional location of the RFID tag and the supplementary information from the RFID tag.

Other aspects and embodiments of the present invention will become apparent from the following detailed description, which, when taken in conjunction with the drawings, illustrate by way of example the principles of the invention.

DETAILED DESCRIPTION

Figure 1:
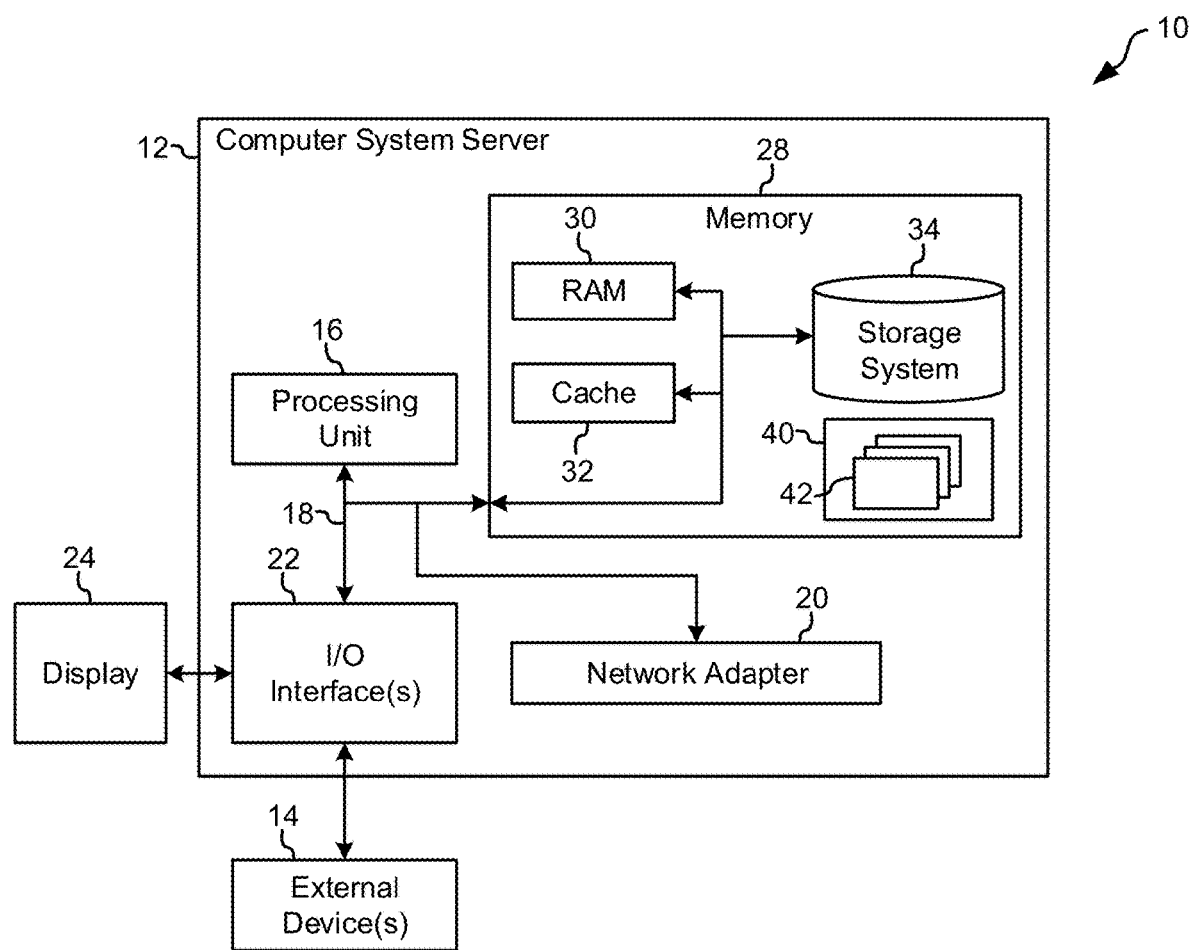
FIG. 1 depicts a cloud computing node according to an embodiment of the present invention.

The following description discloses several preferred embodiments of systems, methods and computer program products for creating a three-dimensional map utilizing retrieved RFID tag information. Various embodiments provide a method for requesting a mobile detection device to retrieve information from an RFID tag, where the information is then used to generate a three-dimensional map that includes a three-dimensional location of the RFID tag, as well as additional data retrieved from the RFID tag.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

In one general embodiment, a computer-implemented method includes identifying a mobile detection device, requesting the mobile detection device to travel to a predetermined location, requesting the mobile detection device to retrieve location information and supplementary information from a radio frequency identification (RFID) tag at the predetermined location, receiving the location information and the supplementary information from the mobile detection device, determining a three-dimensional location of the RFID tag, based on the location information, and creating a three-dimensional map that includes the three-dimensional location of the RFID tag and the supplementary information from the RFID tag.

In another general embodiment, a computer program product for creating a three-dimensional map utilizing retrieved RFID tag information includes a computer readable storage medium having program instructions embodied therewith, where the computer readable storage medium is not a transitory signal per se, and where the program instructions are executable by a processor to cause the processor to perform a method comprising identifying a mobile detection device, utilizing the processor, requesting the mobile detection device to travel to a predetermined location, utilizing the processor, requesting the mobile detection device to retrieve location information and supplementary information from the RFID tag at the predetermined location, utilizing the processor, receiving the location information and the supplementary information from the mobile detection device, utilizing the processor, determining, utilizing the processor, a three-dimensional location of the RFID tag, based on the location information, and creating the three-dimensional map that includes the three-dimensional location of the RFID tag and the supplementary information from the RFID tag, utilizing the processor.

In another general embodiment, a system includes a processor and logic integrated with the processor, executable by the processor, or integrated with and executable by the processor, where the logic is configured to identify a mobile detection device, request the mobile detection device to travel to a predetermined location, request the mobile detection device to retrieve location information and supplementary information from a radio frequency identification (RFID) tag at the predetermined location, receive the location information and the supplementary information from the mobile detection device, determine a three-dimensional location of the RFID tag, based on the location information, and create a three-dimensional map that includes the three-dimensional location of the RFID tag and the supplementary information from the RFID tag.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
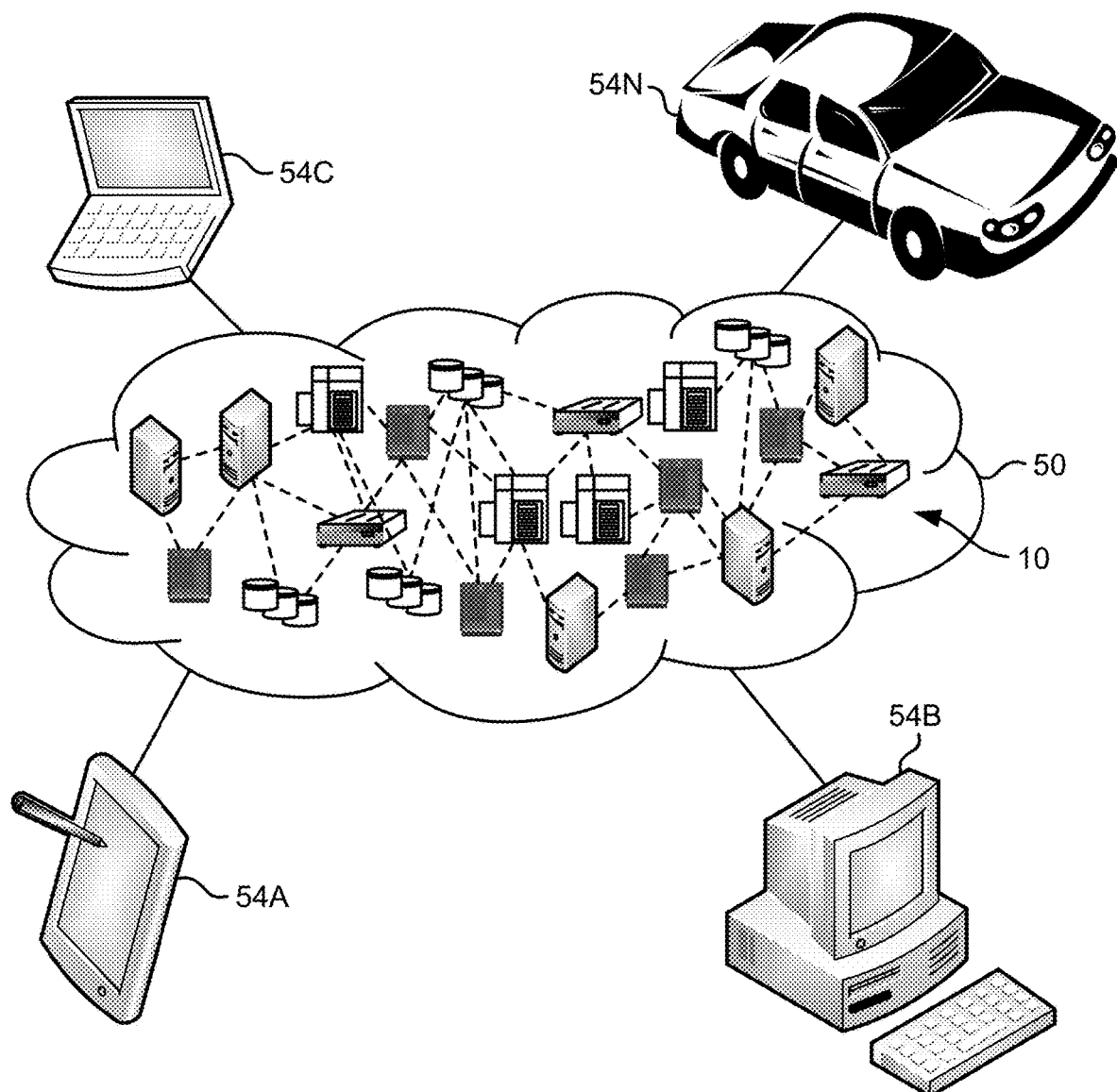
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
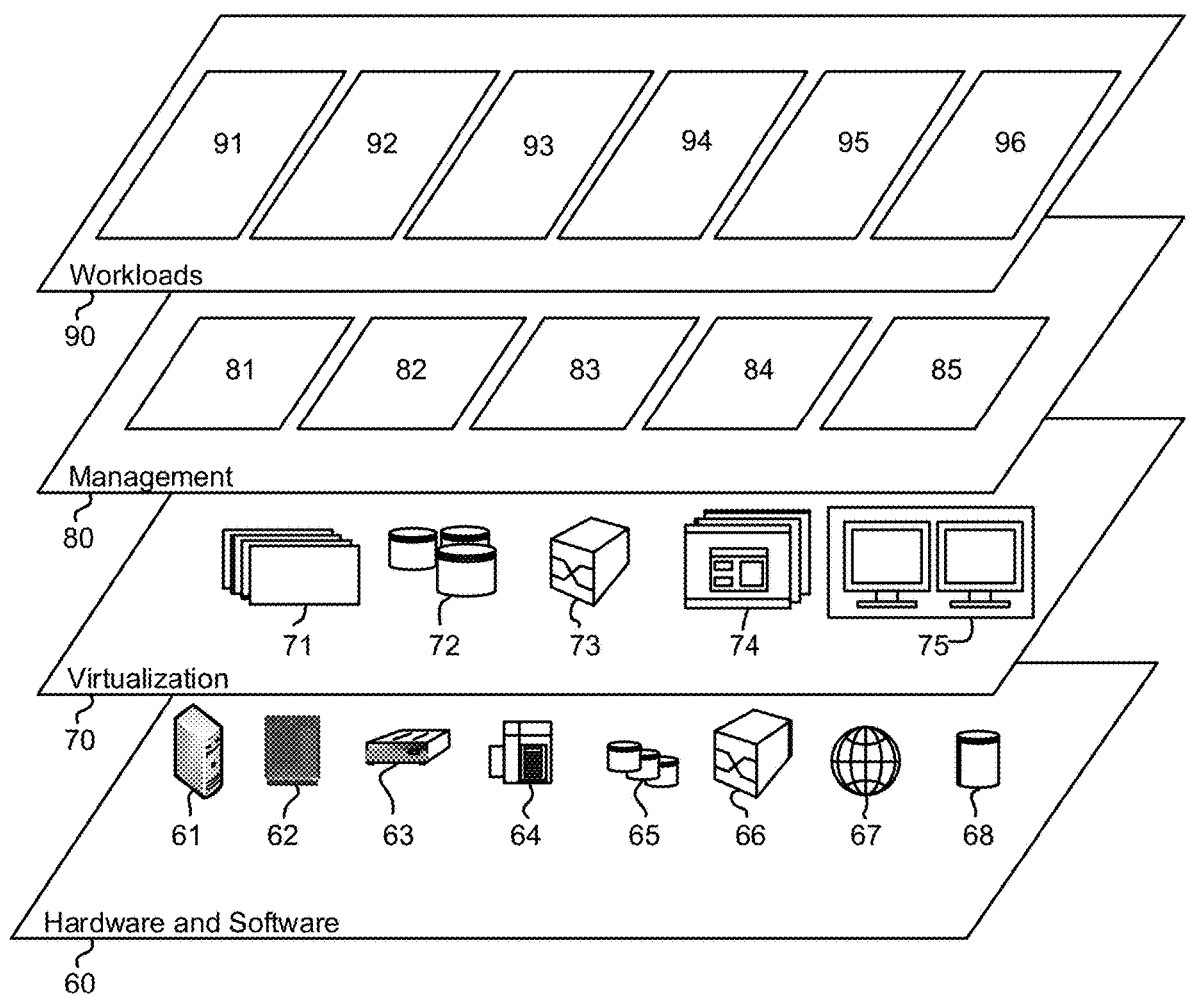
FIG. 3 depicts abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
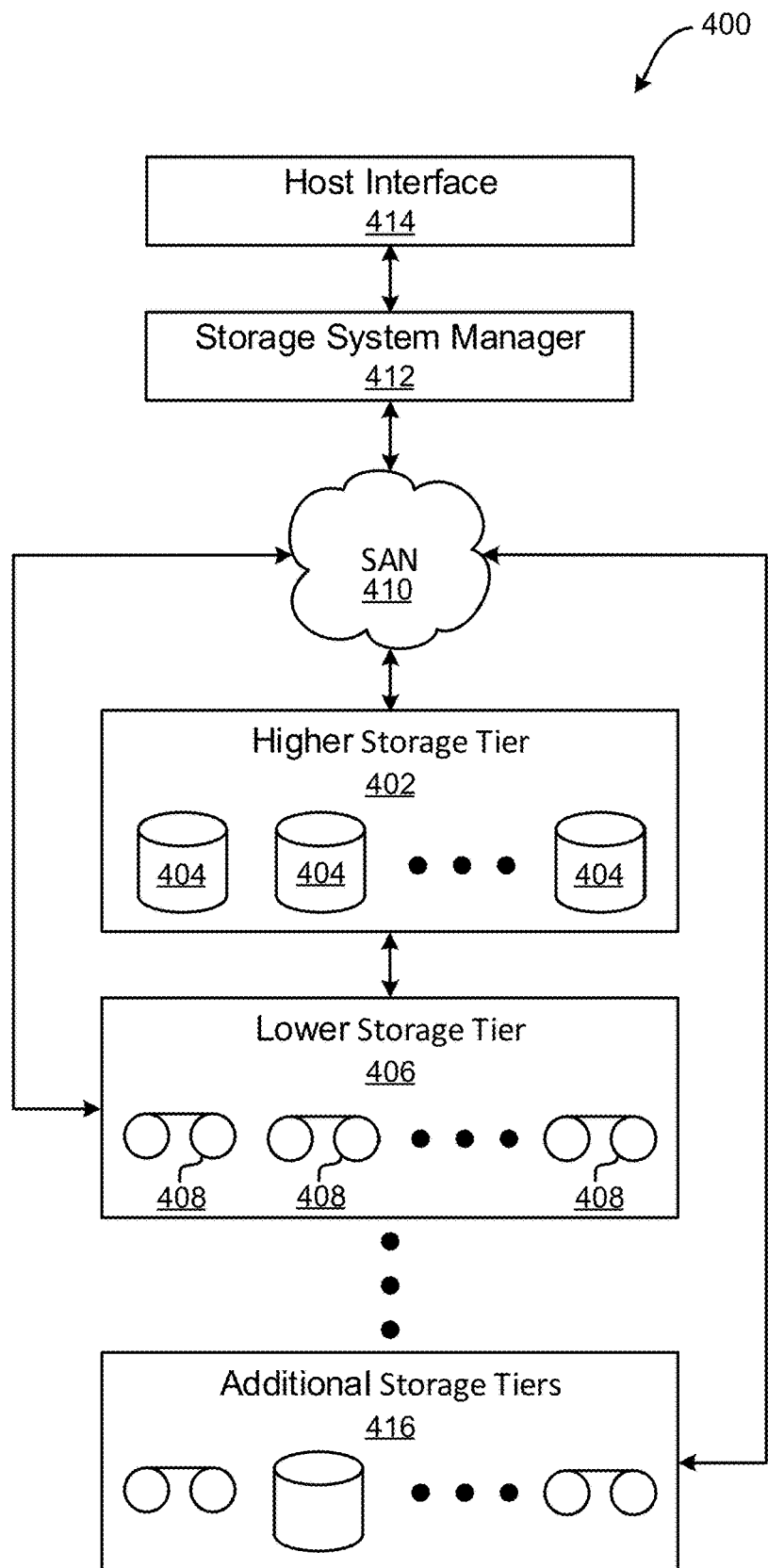
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
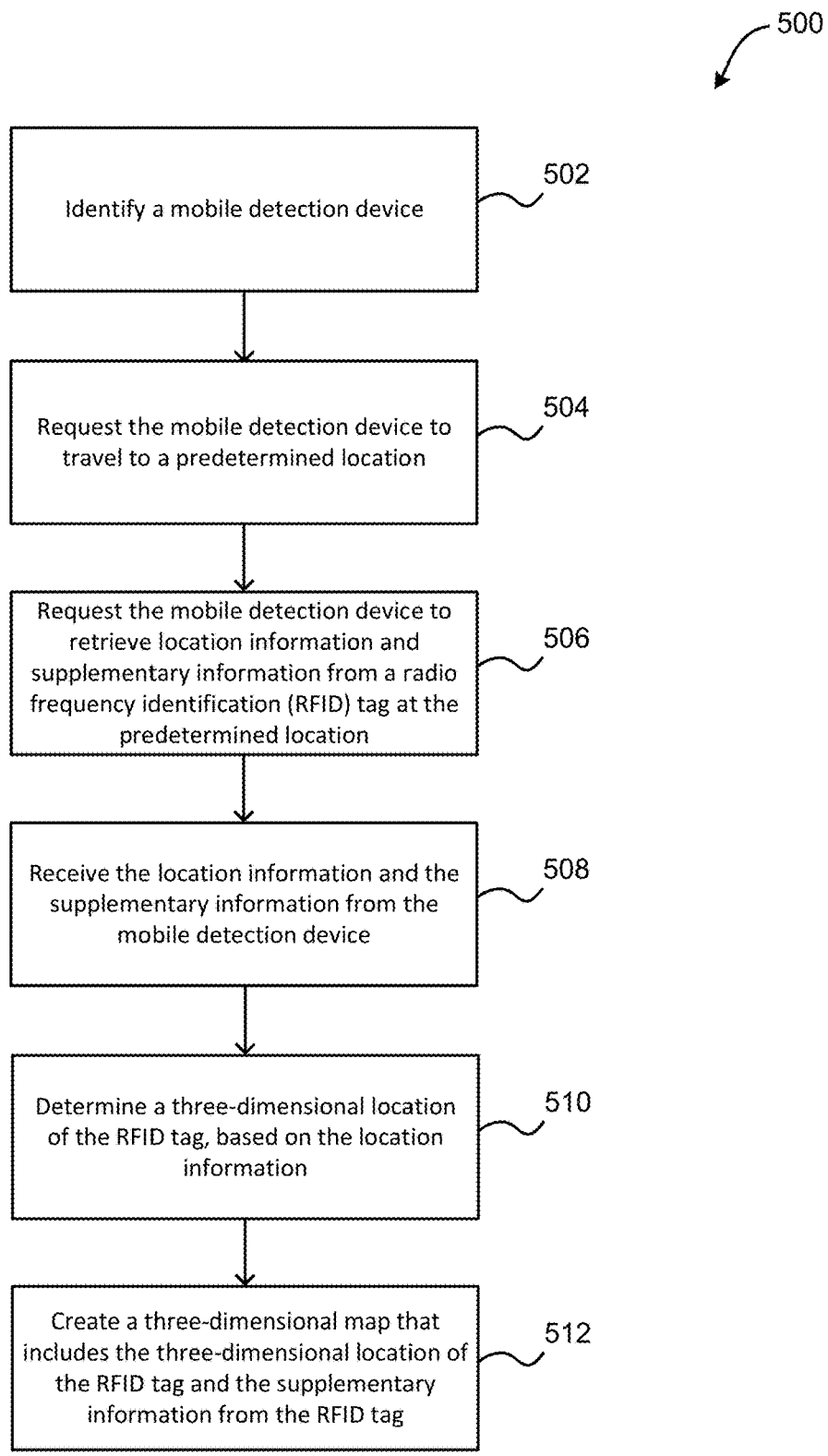
FIG. 5 illustrates a flowchart of a method for creating a three-dimensional map utilizing retrieved RFID tag information, in accordance with one embodiment.

Now referring to FIG. 5, a flowchart of a method 500 is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a mobile detection device is identified. In one embodiment, the identifying may include sending a message to the mobile detection device. In another embodiment, the identifying may include receiving information from the mobile detection device, in response to the message. In another embodiment, the message may be sent over any means of communication. For example, the message may be sent utilizing one or more of cellular communications, wireless network communications, satellite communications, radio communications, etc.

Additionally, in one embodiment, the message may be sent directly to the mobile detection device. In another embodiment, the message may be sent indirectly to the mobile detection device (e.g., by sending the message first to a mobile computing device or mobile detection device controller, which then sends the message to the mobile detection device, etc.). In another embodiment, the message may be sent manually.

Further, in one embodiment, the message may be sent automatically in response to identifying one or more events. For example, the one or more events may include the detection of a predetermined seismic reading (e.g., indicative of an earthquake, etc.). In another embodiment, the one or more events may include the detection of a storm with a predetermined magnitude entering or leaving an area. In yet another embodiment, the one or more events may be identified by monitoring one or more data feeds (e.g., seismic data feeds, weather data feeds, etc.) and comparing the data to a threshold.

Further still, in one embodiment, the one or more events may include the detection of one or more natural disasters. In another embodiment, the one or more events may include a detection of a declaration of a national emergency. In yet another embodiment, the one or more events may be identified by monitoring social media, news updates, internet streams, etc.

Also, in one embodiment, the mobile detection device may include any device capable of unmanned aerial movement. For example, the mobile detection device may include a drone, a quadcopter, an unmanned aerial vehicle (UAV), etc. In another embodiment, the mobile detection device may be included within a predetermined group of devices.

In addition, in one embodiment, all available mobile detection devices that are within a predetermined area may be identified. For example, all available mobile detection devices within a predetermined radius of a location (disaster area, etc.) may be identified. In another embodiment, the identifying may include determining a mobile detection device within the predetermined area that meets predetermined criteria.

For example, the identifying may include requesting information associated with the mobile detection device. For instance, the information may information may include an identification of RFID communication capabilities (e.g., an RFID communicator/reader, etc.) present on the mobile detection device. The information may also include a current battery life of the mobile detection device. Also, the information may include an approval of the user/owner to use the drone for rescue operations in case of emergency.

Furthermore, in one embodiment, the identifying may include selecting only a mobile detection device that meets predetermined criteria (e.g., that has a battery life above a threshold, that includes an RFID reader within the mobile detection device, that has user approval to use for rescue operations, etc.).

Further still, method 500 may proceed with operation 504, where the mobile detection device is requested to travel to a predetermined location. In one embodiment, the requesting may include sending a message (either directly or indirectly) to the mobile detection device utilizing one or more means of communication. In another embodiment, the requesting may include sending destination coordinates, travel directions, etc. to the mobile detection device. In yet another embodiment, the predetermined location may be manually input.

Also, in one embodiment, the predetermined location may be identified based on monitored data. For example, the predetermined location may include geographical coordinates may be calculated based on a physical location of a predetermined event that is identified by analyzing monitored data feeds, news feeds, etc. In another embodiment, the predetermined location may include a predetermined geographical point, a predetermined radius from the predetermined point, a predetermined geographical region, etc.

Additionally, method 500 may proceed with operation 506, where the mobile detection device is requested to retrieve location information and supplementary information from an RFID tag at the predetermined location. In one embodiment, the requesting may include sending a command (either directly or indirectly) to the mobile detection device to broadcast an RFID request from an RFID communicator/reader when the mobile detection device is at or within a predetermined distance from the predetermined location.

Further, in one embodiment, the RFID request may be sent utilizing an RFID communicator/reader within the mobile detection device. For example, the RFID communicator may send out one or more interrogating radio waves. In another embodiment, the RFID request may include a request to communicate with one or more nearby RFID tags. In yet another embodiment, the RFID request may include a request for the supplementary information from the RFID tag.

Further still, in one embodiment, the supplementary information may include identification information stored within the RFID tag. For example, the supplementary information may include one or more of an RFID tag ID, a name and/or description of a person or object to which the RFID tag is associated, etc.

Also, in one embodiment, the RFID tag may include any tag that communicates utilizing radio frequency identification (RFID). For example, the RFID tag may receive a signal from the RFID communicator/reader and may respond with a signal. In another example, the RFID tag may include one or more of an integrated circuit, a means of collecting power from an RFID reader signal, an antenna for receiving and transmitting RFID signals, etc. In yet another example, the RFID tag may be integrated within an entity, may be integrated within a clothing item (e.g., a bracelet, a shoe, a shirt, etc.) worn by a person, etc.

In addition, in one embodiment, the supplementary information may include monitored RFID information obtained by and/or stored in the RFID tag (e.g., utilizing one or more sensors of the RFID tag or in communication with the tag, etc.). For example, the supplementary information may include information associated with an entity that is obtained by monitoring performed by the RFID tag (e.g., a person, an object, etc.). In another embodiment, the monitored RFID information may include an amount of charge stored by the RFID tag, data monitored by the RFID tag using one or more sensors of the tag or in communication with the tag (e.g., biometric data of the entity associated with the tag such as blood pressure/pulse/heart rate of the entity that is detected by one or more sensors of the RFID tag or in communication with the tag, an amount of charge held by a defibrillator being monitored by the RFID tag, an amount of fuel in a generator being monitored by the RFID tag, etc.), etc. In yet another embodiment, the supplementary information may be received by the mobile detection device from the RFID tag, in response to the request.

Furthermore, in one embodiment, the supplementary information may include image data taken by the mobile detection device (e.g., utilizing one or more cameras within the mobile detection device, etc.). For example, the image data may include localized images of the location where the RFID tag is located. In another embodiment, the location information may include a geographical location of the mobile detection device. For example, the location information may include geographical coordinates of the mobile detection device. In another example, the location information may be retrieved utilizing satellite data such as GPS, etc.

Further still, in one embodiment, the location information may also include a charging time for the RFID tag. For example, the RFID tag may be an active tag (e.g., a tag that has one or more associated power supplies such as batteries, capacitors, etc.). In another example, the RFID tag may receive a charge via the RFID request (e.g., the energy sent to the tag by the mobile detection device's RFID request may charge the power supply of the RFID tag). In yet another example, the charging time may indicate a time period between the sending, by the mobile detection device, of the RFID request, and the receipt of a response from the RFID tag. In still another example, the charging time may indicate a time period for the RFID tag to charge a predetermined amount, in response to the RFID request.

Also, method 500 may proceed with operation 508, where the location information and the supplementary information are received from the mobile detection device. In one embodiment, the location information and the supplementary information may be received by the mobile detection device (either directly or indirectly) utilizing one or more means of communication. In another embodiment, the location information and the supplementary information may be received at a mobile computing device, server, a cloud computing environment, etc. In yet another embodiment, the location information and the supplementary information may be received at a mobile computing device and then may be forwarded to a cloud computing environment.

Additionally, method 500 may proceed with operation 510, where a three-dimensional location of the RFID tag is determined, based on the location information. In one embodiment, the three-dimensional location of the RFID tag may be determined utilizing RFID based object localization that considers the charging time for the RFID tag. For example, there may be a correlation between a charging time for the RFID tag and the distance between an RFID communicator/reader of the mobile detection device and the RFID tag. In another example, RFID based object localization may then be applied to determine a distance between the mobile detection device and the RFID tag, based on the correlation.

Further, in one embodiment, the location of the RFID tag may be determined utilizing triangulation. For example, a plurality of mobile detection devices may communicate with a single RFID tag, and location information from each of the plurality of mobile detection devices may be used to triangulate/refine a location of the RFID tag. In another example, a single mobile detection device may be directed to multiple locations, and may communicate with a single RFID tag from the multiple locations, and location information from each of the multiple locations may be used to triangulate/refine a location of the RFID tag.

Further still, in one embodiment, the three-dimensional location of the RFID tag may include X axis, Y axis, and Z axis values. For example, the three-dimensional location of the RFID tag may include geographical coordinates (e.g., latitude, longitude, etc.) as well as a location of the RFID tag above ground, below ground, etc. In another example, if the RFID tag is located underneath one or more objects (e.g., debris), is buried, etc., the three-dimensional location may include a depth at which the RFID tag is buried, covered, etc. In yet another example, a distance between an RFID reader and a surface (e.g., the ground, debris, water, etc.) may be compared to a distance between the RFID reader and the RFID tag in order to determine a depth at which the RFID tag is located below the surface.

Also, method 500 may proceed with operation 512, where a three-dimensional map is created that includes the three-dimensional location of the RFID tag and the supplementary information from the RFID tag. In one embodiment, the three-dimensional map may include a map indicating geographical location coordinates as well as height/depth measurements for the RFID tag. In another embodiment, the three-dimensional location of the RFID tag may be used to indicate a position of the RFID tag on the three-dimensional map, as well as a depth or height for the RFID tag at the position.

In addition, in one embodiment, the supplementary information may be displayed in association with the three-dimensional location of the RFID tag within the three-dimensional map. For example, the supplementary information may be displayed when the three-dimensional location is selected, may be displayed next to the three-dimensional location, etc. In another example, image data taken by the mobile detection device may be used to provide a pictorial representation of the three-dimensional location within the three-dimensional map.

Furthermore, in one embodiment, the three-dimensional location of the RFID tag may be requested and/or updated based on a predetermined interval. In another embodiment, the supplementary information from the RFID tag may be requested and/or updated based on a predetermined interval. In this way, an up to date three-dimensional location of an RFID tag (having a high level of accuracy) as well as a condition of an entity associated with the RFID tag may be identified within the three-dimensional map.

Further still, in one embodiment, the three-dimensional map may be provided to one or more one or more users who are searching for the entity associated with the RFID tag (e.g., a search and rescue team, a recovery team, etc.). In another embodiment, the three-dimensional map may also be broadcast to users within a predetermined location of the RFID tag. For example, the three-dimensional map may be sent as an emergency broadcast to an application on all mobile devices within a predetermined radius of the RFID tag.

Also, in one embodiment, the three-dimensional location and the supplementary information may be determined for a plurality of RFID tags simultaneously (e.g., utilizing a plurality of mobile detection devices at different altitudes and different locations/directions, etc.). In another embodiment, the mobile detection device may be requested to emit a light or sound, in response to detecting the RFID tag. in this way, the three-dimensional location and supplementary information may be used to quickly locate and recover the entity associated with the RFID tag.

Figure 6:
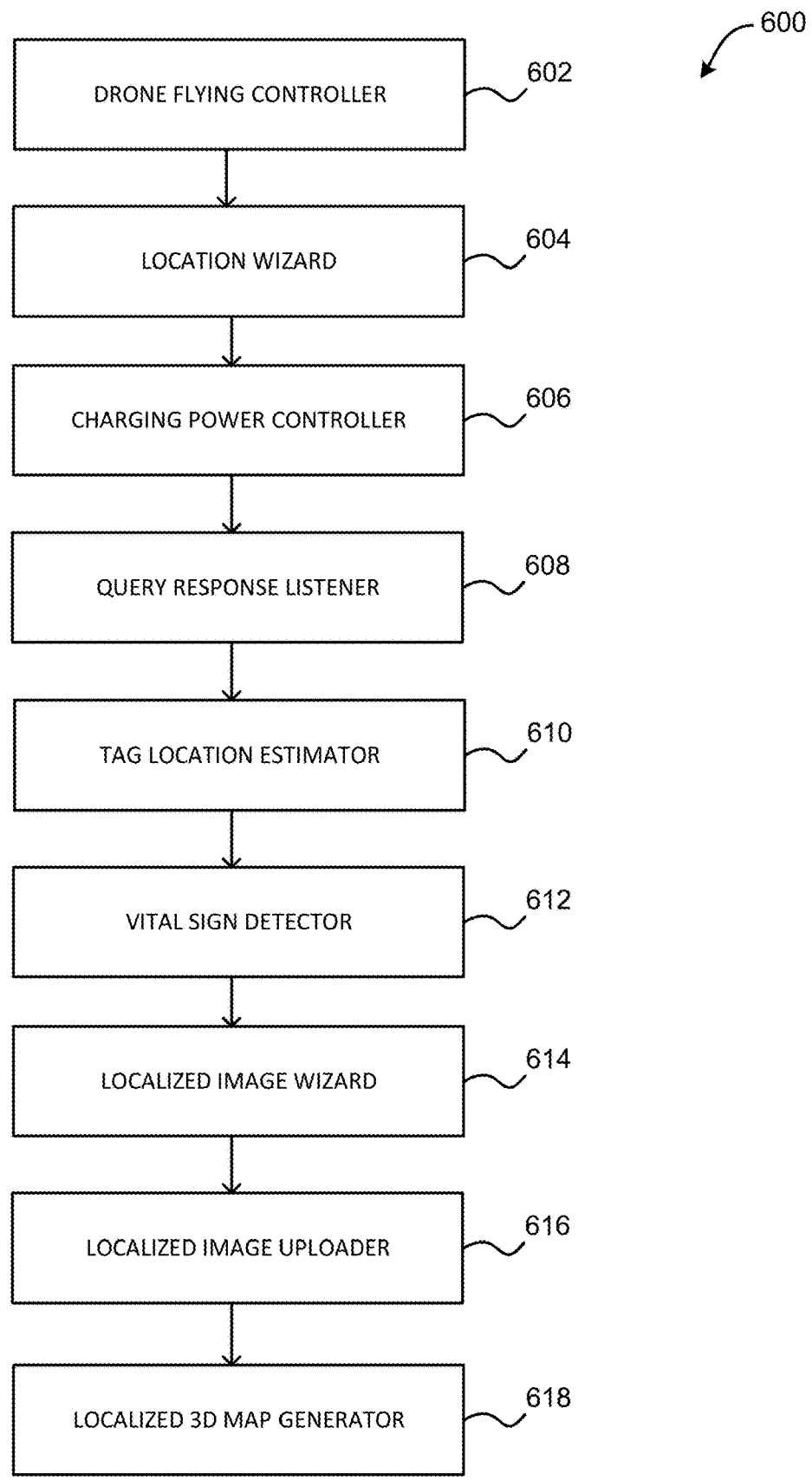
FIG. 6 illustrates an exemplary framework for performing three-dimensional RFID location, in accordance with one embodiment.

FIG. 6 illustrates an exemplary framework 600 for performing three-dimensional RFID location, according to one embodiment. The framework 600 includes a plurality of component modules 602-618 that are used to perform three-dimensional RFID location. Each of these component modules 602-618 may include hardware and/or software and may be included within one or more of a mobile detection device, a server computer, a mobile computing device, a cloud computing environment, etc.

As shown, the framework 600 includes a drone flying controller 602. In one embodiment, the drone flying controller 602 may include a module for controlling a drone. For example, the drone flying controller 602 may control a speed of the drone, a height of the drone, a location of the drone, etc. Additionally, the framework 600 includes a location wizard 604. In one embodiment, the location wizard 604 may include a module for detecting a precise location of an RFID tag. For example, the location wizard 604 may calculate a charging time for an active RFID tag, utilizing an RFID reader that is integrated into a drone.

Further, the framework 600 includes a charging power controller 606. In one embodiment, the charging power controller 606 may include an enhanced controller for dynamically determining and calibrating a charging power of a detected RFID tag, which may assist in improving a positioning accuracy for the RFID tag and may allow for continuous RFID tag tracking.

Further still, the framework 600 includes a query response listener 608. In one embodiment, the query response listener 608 may include a module for continuously monitoring for messages sent from RFID tags (e.g., once the RFID tags are charged) in response to query messages from an RFID reader (e.g., within a drone, etc.).

Also, the framework 600 includes a tag location estimator 610. In one embodiment, the tag location estimator 610 may analyze a response time between an RFID tag and an RFID reader (e.g., within a drone, etc.), according to a provided delay time for the RFID tag to respond, and a calculated distance between the RFID tag and the RFID reader, in order to estimate a location of the RFID tag. This location estimate may be provided to an application (e.g., an automatic law/regulation compliance checking application, etc.).

In addition, the framework 600 includes a vital sign detector 612. In one embodiment, the vital sign detector 612 may detect one or more vital signs for an entity (e.g., pulse, blood pressure, heart rate, etc.) that is monitored by a sensor attached to and/or integrated with an RFID tag worn by the entity, or by a sensor worn by the entity that is in communication with the tag.

Furthermore, the framework 600 includes a localized image wizard 614. In one embodiment, the localized image wizard 614 may include a module for controlling one or more on-board cameras of a drone to take pictures of a predetermined location (e.g., a specific location where an RFID tag and associated entity is located, etc.).

Further still, the framework 600 includes a localized image uploader 616. In one embodiment, the localized image uploader 616 may include a module for uploading the images from the localized image wizard 614 to one or more servers, a cloud computing environment, one or more portable computing devices, etc.

Also, the framework 600 includes a localized three-dimensional map generator 618. In one embodiment, the localized three-dimensional map generator 618 may include a module for generating a three-dimensional map utilizing collected data, where the three-dimensional map includes a location and depth for an RFID tag and associated entity, as well as image data associated with the location.

Figure 7:
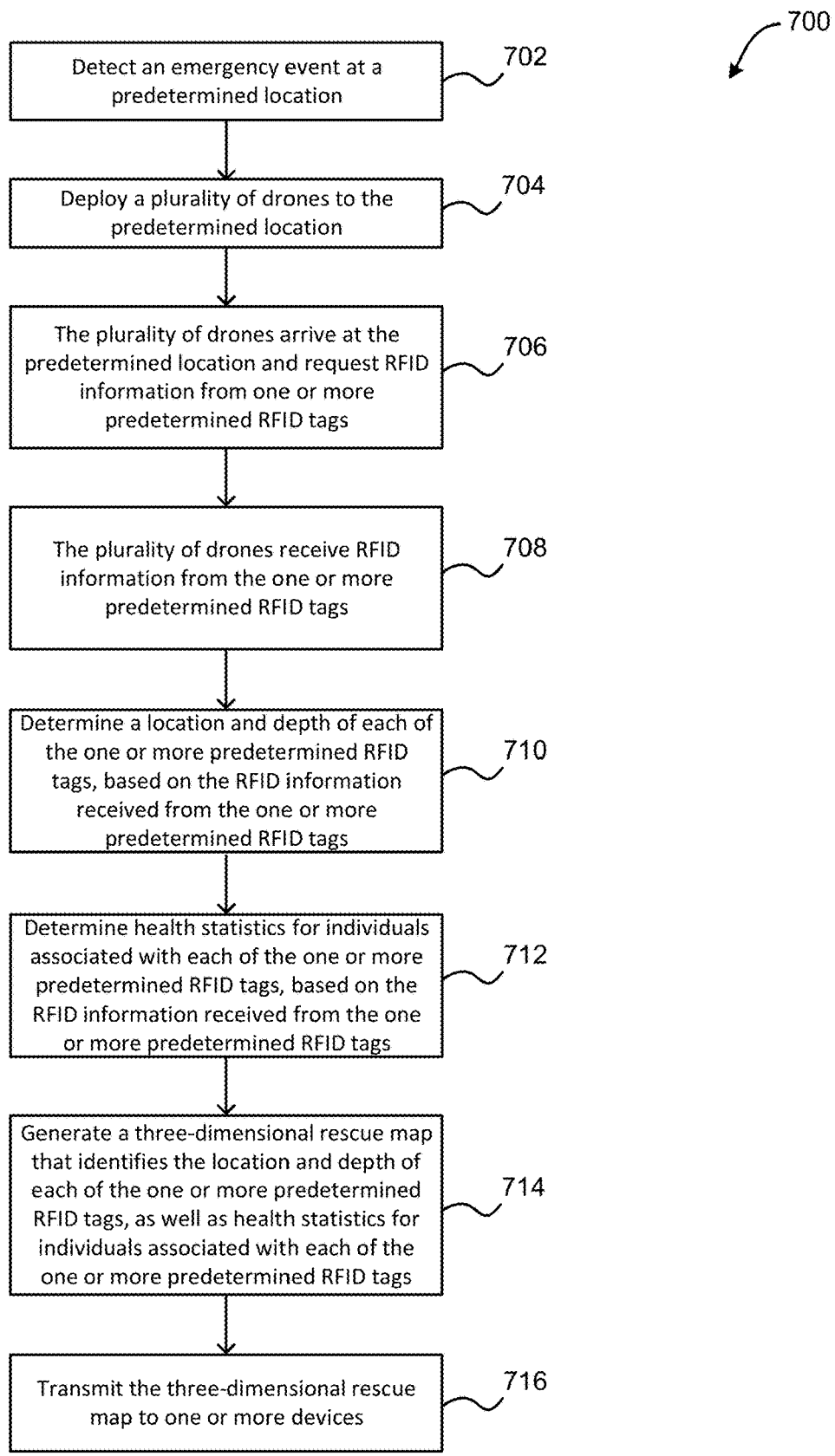
FIG. 7 illustrates a flowchart of a method for responding to an emergency event, in accordance with one embodiment.

Now referring to FIG. 7, a flowchart of a method 700 for responding to an emergency event is shown, according to one embodiment. The method 700 may be performed in accordance with the present invention in any of the environments depicted in FIGS. 1-4 and 6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where an emergency event is detected at a predetermined location. In one embodiment, the emergency event may include a natural disaster, an accident, etc. In another embodiment, the emergency event may be detected by monitoring one or more data streams, data sources, online media, etc. For example, a monitoring module may monitor news feeds, seismic monitors, etc. in order to detect an emergency event. In yet another embodiment, the predetermined location may be calculated utilizing the data streams, may be specifically provided by one or more data sources, etc. In one embodiment, the emergency event may be detected by a computing environment (e.g., a server computer, a mobile computing device, a cloud computing environment, etc.).

Additionally, method 700 may proceed with operation 704, where a plurality of drones are deployed to the predetermined location. In one embodiment, one or more of the plurality of drones may include rescue drones used specifically for emergency event response. For example, a fire department, police station, etc. may have a plurality of drones to be used in case of an emergency event. In one embodiment, the plurality of drones may be deployed by a computing environment (e.g., a server computer, a mobile computing device, a cloud computing environment, etc.).

In another embodiment, one or more of the plurality of drones may include commercial drones (e.g., drones used by one or more companies to deliver goods, monitor activities, etc.), recreational drones (e.g., drones used by users for entertainment, etc.), etc. For example, a user who purchases a recreational drone may optionally agree to use of their drone for emergency event support (e.g., by changing hardware and/or software within the drone, etc.).

In yet another embodiment, the plurality of drones may be deployed by sending one or more commands to each of the plurality of drones. For example, the one or more commands may include an identification of the emergency event and a request to participate in rescue operations. In another example, the one or more commands may include geographical coordinates associated with the predetermined location, a predetermined radius from the geographical coordinates, geographical coordinates associated with a predetermined region in which the emergency event is occurring, etc.

Further, method 700 may proceed with operation 706, where the plurality of drones arrive at the predetermined location and request RFID information from one or more predetermined RFID tags. In one embodiment, the plurality of drones may request the RFID information using an RFID reader located on each of the plurality of drones. In another embodiment, the predetermined RFID tags may include RFID tags integrated into one or more wearable items. For example, the predetermined RFID tags may be integrated into bracelets provide to and worn by individuals at and around the predetermined location.

Further still, method 700 may proceed with operation 708, where the plurality of drones receive RFID information from the one or more predetermined RFID tags. In one embodiment, RFID readers located on the plurality of drones may receive radio frequency signals sent by the one or more predetermined RFID tags in response to the request for RFID information. This RFID information may then be sent from the plurality of drones to a central computing system (e.g. a cloud computing environment, one or more server computers, one or more mobile computing devices, etc.).

Also, method 700 may proceed with operation 710, where a location and depth of each of the one or more predetermined RFID tags is determined, based on the RFID information received from the one or more predetermined RFID tags. For example, the RFID information may include a response time for the RFID tags and/or a charging time for the one or more predetermined RFID tags, which may be used by a localization algorithm to determine a distance between RFID readers of the plurality of drones and the one or more predetermined RFID tags.

This distance may be compared to a measured altitude of the plurality of drones in order to determine a depth under a surface (e.g., ground, debris, water, etc.) at which each of the one or more predetermined RFID tags are located. This distance may also be compared to determined geographical coordinates for the plurality of drones in order to determine geographical coordinates for the one or more predetermined RFID tags.

In another embodiment, the location and depth of each of the one or more predetermined RFID tags may be determined by one or more of the plurality of drones, based on the RFID information received from the one or more predetermined RFID tags. In yet another embodiment, the RFID information received from the one or more predetermined RFID tags may be transmitted to another computing environment and the other computing environment may determine the location and depth of each of the one or more predetermined RFID tags.

In addition, method 700 may proceed with operation 712, where health statistics for individuals associated with each of the one or more predetermined RFID tags are determined, based on the RFID information received from the one or more predetermined RFID tags. For example, each of the one or more predetermined RFID tags may include one or more sensors that detect health statistics for individuals associated with the one or more predetermined RFID tags (e.g., individuals wearing one or more devices in which the one or more predetermined RFID tags are embedded, etc.). These health statistics may be sent from the one or more predetermined RFID tags to the plurality of drones as part of the RFID information. The plurality of drones may then send these health statistics to another computing environment.

Furthermore, method 700 may proceed with operation 714, where a three-dimensional rescue map is generated that identifies the location and depth of each of the one or more predetermined RFID tags, as well as health statistics for individuals associated with each of the one or more predetermined RFID tags. In one embodiment, the three-dimensional rescue map may include a map providing geographical coordinates as well as depth measurements for each RFID tag. In another embodiment, within the three-dimensional map, a location and depth of each RFID tag may be identified. One or more images of the location may also be created and transmitted by the plurality of drones and may be presented within the three-dimensional map in association with the location and depth information.

Further still, method 700 may proceed with operation 716, where the three-dimensional rescue map is transmitted to one or more devices. In one embodiment, the one or more devices may include a rescue team deployed to the emergency event. In another embodiment, the one or more devices may include mobile computing devices that are located within a predetermined distance from the emergency event, the predetermined location, etc.

In yet another embodiment, the location and depth of each of the one or more predetermined RFID tags may be periodically updated (e.g., according to a schedule, etc.) within the three-dimensional rescue map. The health statistics for individuals associated with each of the one or more predetermined RFID tags may also be periodically updated within the three-dimensional rescue map as well.

In this way, an inexpensive device worn by an individual may include an embedded RFID tag that may be used in conjunction with the plurality of drones, to monitor and locate the individual during an emergency event and assist in rescue operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    identifying a mobile detection device;
    requesting the mobile detection device to travel to a predetermined location;
    requesting the mobile detection device to retrieve location information and supplementary information from a radio frequency identification (RFID) tag at the predetermined location;
    receiving the location information and the supplementary information from the mobile detection device, the location information including geographical coordinates of the mobile detection device, as well as a charging time for the RFID tag that indicates a time period between a sending, by the mobile detection device, of an RFID request, and a receipt of a response from the RFID tag;
    determining a three-dimensional location of the RFID tag, utilizing the geographical coordinates of the mobile detection device and the charging time for the RFID tag, including determining a distance between the mobile detection device and the RFID tag, based on the charging time for the RFID tag; and
    creating a three-dimensional map that includes the three-dimensional location of the RFID tag and the supplementary information from the RFID tag.

2. The computer-implemented method of claim 1, wherein:
    the identifying includes sending a message to the mobile detection device in response to identifying one or more events, and receiving information from the mobile detection device, in response to the message,
    the one or more events are identified by monitoring one or more data feeds and comparing data from the one or more data feeds to a threshold, and
    all available mobile detection devices within a predetermined radius of a location of the one or more events are identified.

3. The computer-implemented method of claim 1, wherein the predetermined location includes geographical coordinates that are calculated based on a physical location of a predetermined event.

4. The computer-implemented method of claim 1, wherein requesting the mobile detection device to retrieve the location information and the supplementary information from the RFID tag includes sending a command to the mobile detection device to broadcast an RFID request from an RFID communicator within the mobile detection device in response to determining that the mobile detection device is within a predetermined distance from the predetermined location.

5. The computer-implemented method of claim 1, wherein the supplementary information includes biometric data obtained by and stored in the RFID tag.

6. The computer-implemented method of claim 1, wherein the supplementary information includes image data taken by the mobile detection device, utilizing one or more cameras within the mobile detection device.

7. The computer-implemented method of claim 1, wherein:
    the supplementary information includes biometric data obtained by and stored in the RFID tag, and image data taken by the mobile detection device, utilizing one or more cameras within the mobile detection device,
    identifying the mobile detection device includes requesting information associated with the mobile detection device, the information including an identification of RFID communication capabilities, a current battery life of the mobile detection device, and user approval to use the mobile detection device for predetermined operations,
    the mobile detection device is selected in response to determining that the current battery life of the mobile detection device is above a threshold, the mobile detection device includes an RFID reader, and the mobile detection device includes the user approval to use the mobile detection device for predetermined operations, and
    the three-dimensional location of the RFID tag includes latitude, longitude, and a location of the RFID tag below a surface, where a distance between an RFID reader and the surface is compared to a distance between the RFID reader and the RFID tag to determine a depth at which the RFID tag is located below the surface.

8. The computer-implemented method of claim 1, wherein:
    identifying the mobile detection device includes requesting information associated with the mobile detection device, the information including an identification of RFID communication capabilities, a current battery life of the mobile detection device, and user approval to use the mobile detection device for predetermined operations, and
    the mobile detection device is selected in response to determining that the current battery life of the mobile detection device is above a threshold, the mobile detection device includes an RFID reader, and the mobile detection device includes the user approval to use the mobile detection device for predetermined operations.

9. The computer-implemented method of claim 1, wherein the three-dimensional location of the RFID tag includes latitude, longitude, and a location of the RFID tag below a surface, where a distance between an RFID reader and the surface is compared to a distance between the RFID reader and the RFID tag to determine a depth at which the RFID tag is located below the surface.

10. The computer-implemented method of claim 1, further comprising updating the three-dimensional location of the RFID tag, and the supplementary information from the RFID tag, based on a predetermined interval.

11. A computer program product for creating a three-dimensional map utilizing retrieved RFID tag information, the computer program product comprising a computer readable storage medium having program instructions embodied therewith, wherein the computer readable storage medium is not a transitory signal per se, the program instructions executable by a processor to cause the processor to perform a method comprising:
    identifying a mobile detection device, utilizing the processor;
    requesting the mobile detection device to travel to a predetermined location, utilizing the processor;
    requesting the mobile detection device to retrieve location information and supplementary information from the RFID tag at the predetermined location, utilizing the processor;

receiving the location information and the supplementary information from the mobile detection device, utilizing the processor, the location information including geographical coordinates of the mobile detection device, as well as a charging time for the RFID tag that indicates a time period between a sending, by the mobile detection device, of an RFID request, and a receipt of a response from the RFID tag;

determining, utilizing the processor, a three-dimensional location of the RFID tag, utilizing the geographical coordinates of the mobile detection device and the charging time for the RFID tag, including determining a distance between the mobile detection device and the RFID tag, based on the charging time for the RFID tag; and creating the three-dimensional map that includes the three-dimensional location of the RFID tag and the supplementary information from the RFID tag, utilizing the processor.

12. The computer program product of claim 11, wherein the identifying includes sending, utilizing the processor, a message to the mobile detection device in response to identifying one or more events, and receiving, utilizing the processor, information from the mobile detection device, in response to the message.

13. The computer program product of claim 11, wherein the predetermined location includes geographical coordinates that are calculated based on a physical location of a predetermined event.

14. The computer program product of claim 11, wherein requesting the mobile detection device to retrieve the location information and the supplementary information from the RFID tag includes sending, utilizing the processor, a command to the mobile detection device to broadcast an RFID request from an RFID communicator within the mobile detection device in response to determining that the mobile detection device is within a predetermined distance from the predetermined location.

15. The computer-implemented method of claim 1, wherein:
the supplementary information includes biometric data obtained by and stored in the RFID tag, and image data taken by the mobile detection device, utilizing one or more cameras within the mobile detection device, and
the three-dimensional location of the RFID tag includes latitude, longitude, and a location of the RFID tag below a surface, where a distance between an RFID reader and the surface is compared to a distance between the RFID reader and the RFID tag to determine a depth at which the RFID tag is located below the surface.

16. The computer-implemented method of claim 1, wherein:
identifying the mobile detection device includes requesting information associated with the mobile detection device, the information including an identification of RFID communication capabilities, a current battery life of the mobile detection device, and user approval to use the mobile detection device for predetermined operations,
the mobile detection device is selected in response to determining that the current battery life of the mobile detection device is above a threshold, the mobile detection device includes an RFID reader, and the mobile detection device includes the user approval to use the mobile detection device for predetermined operations, and
the three-dimensional location of the RFID tag includes latitude, longitude, and a location of the RFID tag below a surface, where a distance between an RFID reader and the surface is compared to a distance between the RFID reader and the RFID tag to determine a depth at which the RFID tag is located below the surface.

17. The computer-implemented method of claim 1, wherein determining the distance between the mobile detection device and the RFID tag, based on the charging time for the RFID tag, includes applying object localization to determine the distance between the mobile detection device and the RFID tag, based on a correlation between the charging time for the RFID tag and the distance between the mobile detection device and the RFID tag.

18. The computer-implemented method of claim 1, wherein:
the supplementary information includes biometric data obtained by and stored in the RFID tag, and image data taken by the mobile detection device, utilizing one or more cameras within the mobile detection device,
identifying the mobile detection device includes requesting information associated with the mobile detection device, the information including an identification of RFID communication capabilities, a current battery life of the mobile detection device, and user approval to use the mobile detection device for predetermined operations, and
the mobile detection device is selected in response to determining that the current battery life of the mobile detection device is above a threshold, the mobile detection device includes an RFID reader, and the mobile detection device includes the user approval to use the mobile detection device for predetermined operations.

19. The computer-implemented method of claim 1, wherein the supplementary information includes:
biometric data obtained by and stored in the RFID tag, and
image data taken by the mobile detection device, utilizing one or more cameras within the mobile detection device.

20. A system, comprising:
a processor; and
logic integrated with the processor, executable by the processor, or integrated with and executable by the processor, the logic being configured to:
identify a mobile detection device;
request the mobile detection device to travel to a predetermined location;
request the mobile detection device to retrieve location information and supplementary information from a radio frequency identification (RFID) tag at the predetermined location;
receive the location information and the supplementary information from the mobile detection device, the location information including geographical coordinates of the mobile detection device, as well as a charging time for the RFID tag that indicates a time period between a sending, by the mobile detection device, of an RFID request, and a receipt of a response from the RFID tag;
determine a three-dimensional location of the RFID tag, utilizing the geographical coordinates of the mobile detection device and the charging time for the RFID tag, including determining a distance between the mobile detection device and the RFID tag, based on the charging time for the RFID tag; and create a three-dimensional map that includes the three-dimensional location of the RFID tag and the supplementary information from the RFID tag.

\* \* \* \* \*